United States Patent [19]

Vaidya et al.

[11] Patent Number: 4,785,242

[45] Date of Patent: Nov. 15, 1988

[54] POSITION DETECTING APPARATUS USING MULTIPLE MAGNETIC SENSORS FOR DETERMINING RELATIVE AND ABSOLUTE ANGULAR POSITION

[75] Inventors: Jayant G. Vaidya; Caio Ferreira, both of Rockford, Ill.

[73] Assignee: Sundstrand Corporation, Rockford, Ill.

[21] Appl. No.: 941,850

[22] Filed: Dec. 15, 1986

[51] Int. Cl.[4] .............................................. G01B 7/30
[52] U.S. Cl. ................................. 324/208; 310/68 B; 340/870.32
[58] Field of Search ............... 324/207, 208, 165, 166, 324/173–175; 310/68 B, 168; 340/672, 686, 870.32, 870.33

[56] References Cited

U.S. PATENT DOCUMENTS

| | | | |
|---|---|---|---|
| 3,728,565 | 4/1973 | O'Callaghan | 310/168 |
| 3,819,268 | 6/1974 | Johnson | 356/28 |
| 4,166,977 | 9/1979 | Glauert et al. | 324/173 |
| 4,241,300 | 12/1980 | Hayes et al. | 318/590 |
| 4,258,324 | 3/1981 | Henrich | 324/392 |
| 4,280,165 | 7/1981 | Pospelov et al. | 361/236 |
| 4,288,746 | 9/1981 | Singbartl | 324/174 |
| 4,319,188 | 3/1982 | Ito et al. | 324/173 |
| 4,326,166 | 4/1982 | Pigeon et al. | 324/225 |
| 4,359,685 | 11/1982 | Eguchi et al. | 324/208 |
| 4,369,405 | 1/1983 | Sato et al. | 324/174 |
| 4,370,614 | 1/1983 | Kawada et al. | 324/173 |
| 4,480,248 | 10/1984 | Sudo et al. | 338/32 R |
| 4,481,469 | 11/1984 | Hauler et al. | 324/174 |
| 4,490,674 | 12/1984 | Ito | 324/208 |
| 4,506,217 | 3/1985 | Rothley et al. | 324/208 |
| 4,506,220 | 3/1985 | Sawada et al. | 324/252 |
| 4,506,339 | 3/1985 | Kuhnlein | 364/565 |
| 4,518,918 | 5/1985 | Avery | 324/208 |
| 4,677,377 | 6/1987 | Takahashi et al. | 324/208 |

FOREIGN PATENT DOCUMENTS

| | | | |
|---|---|---|---|
| 0160613 | 12/1981 | Japan | 324/208 |
| 0042412 | 9/1983 | Japan | 324/208 |
| 0196619 | 10/1985 | Japan | 324/208 |
| 8201178 | 10/1983 | Netherlands | 324/208 |

Primary Examiner—Gerard R. Strecker
Attorney, Agent, or Firm—Wood, Dalton, Phillips, Mason & Rowe

[57] ABSTRACT

In order to optimize the electrical performance in motors in terms of improved efficiency, power factor, and reduced current, a position detecting apparatus utilizes a first magnetic sensing device for accurately determining the angular position of a rotor and a second magnetic sensing device for absolutely determining the angular position of the rotor. The first magnetic sensing device includes a first target operatively associated with the rotor so as to rotate therewith and also includes a first sensor disposed at a fixed distance from the first target independent of the absolute angular position of the rotor to define a first air gap therebetween and a first magnet is disposed in proximity to the first target and the first sensor to create a first magnetic field in the first air gap. With this arrangement, the first sensor cooperates with the first target to accurately determine the angular position of the rotor by detecting incremental variations in the first magnetic field in the first air gap. The second magnetic sensing device includes a second target operatively associated with the rotor so as to rotate therewith. A second sensor is disposed at a variable distance from the second target dependent upon the absolute angular position of the rotor to define a second air gap therebetween, and the second magnetic sensing device also includes a second magnet disposed in proximity to the second target and the second sensor to create a second magnetic field in the second air gap. With this arrangement, the second sensor cooperates with the second target to absolutely determine the angular position of the rotor by detecting continuous variations in the second magnetic field in the second air gap.

31 Claims, 2 Drawing Sheets

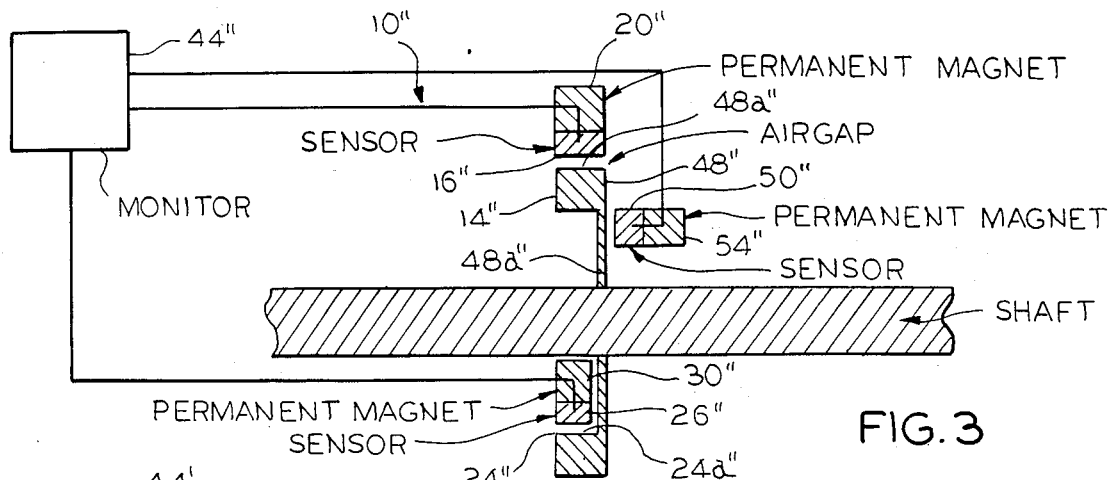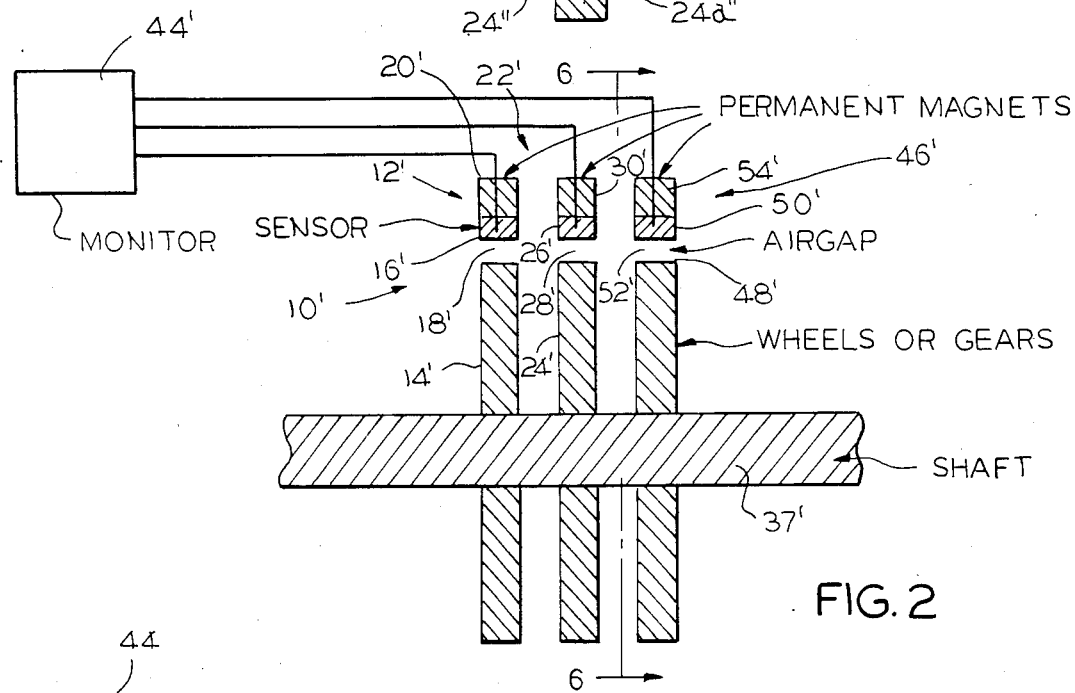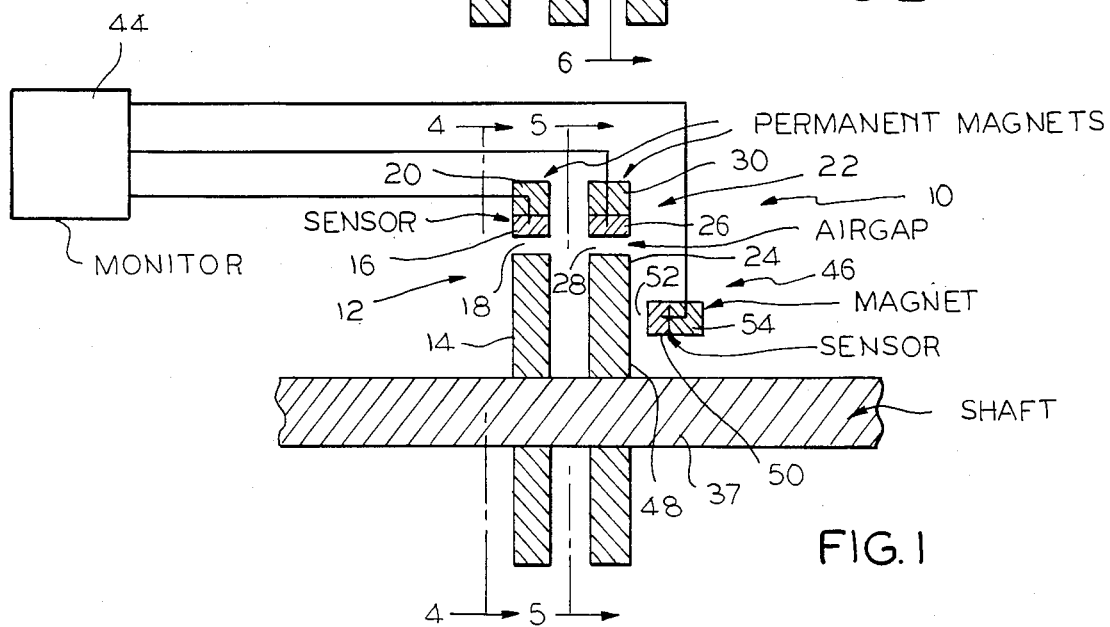

POSITION DETECTING APPARATUS USING MULTIPLE MAGNETIC SENSORS FOR DETERMINING RELATIVE AND ABSOLUTE ANGULAR POSITION

FIELD OF THE INVENTION

The present invention is directed to an apparatus for detecting the position of a rotor and, more particularly, to a position detecting apparatus using multiple magnetic sensors.

BACKGROUND OF THE INVENTION

In order to optimize electrical performance in brushless DC motors in terms of improved efficiency, power factor, and reduced current, it is important to be able to determine the angular position of the rotor. It has been possible to determine the position accurately, but not absolutely with some techniques such as with a null detector which is essentially an incremental sensor that can be used for counting and determining velocity. While a null detector is very accurate, and is not adversely affected by the effects of temperature and the like, it cannot determine the angular position of the rotor in an absolute sense.

On the other hand, it has been possible to determine the angular position of a rotor absolutely, but not accurately with some other techniques, such as with an absolute sensor that measures the distance between the sensor and the rotating wheel where the distance is continuously variable. While an absolute sensor can be utilized where temperature variations are negligible, and is well-suited for use as a counter for determining the number of revolutions, it is not well-suited where accuracy is important in an atmosphere of variable temperature and the like.

In the past, it has been proposed to utilize a stationary magnetic sensor to determine the angular position of a rotor in an accurate but not absolute sense. This is proposed, for instance, in Rothley et al U.S. Pat. No. 4,506,217 which also senses speed, and an Sato et al U.S. Pat. No. 4,369,405 which discloses an AC power generated apparatus utilizing rotating magnet poles. In addition, Glauert et al U.S. Pat. No. 4,166,977 also discloses a rotary speed and angular position determining system.

Still other speed and position detecting apparatus are disclosed in U.S. Pat. Nos. 4,370,614; 4,490,674; 4,481,469; 4,506,339; 4,359,685; and 3,728,565. Nevertheless, it has remained to provide a position detecting apparatus using multiple magnetic sensors to determine angular position of a rotor accurately and absolutely whether stationary or rotating.

The present invention is directed to overcoming the above-stated problems and accomplishing the stated objects.

SUMMARY OF THE INVENTION

Accordingly, the present invention is directed to a position detecting apparatus utilizing first magnetic sensing means for accurately determining the angular position of a rotor and second magnetic sensing means for absolutely determining the angular position of the rotor. The first magnetic sensing means includes first target means operatively associated with the rotor so as to rotate therewith and also includes first sensor means disposed at a fixed distance from the first target means independent of the absolute angular position of the rotor to define a first air gap therebetween and first magnet means disposed in proximity to the first target means and the first sensor means to create a first magnetic field in the first air gap. With this arrangement, the first sensor means cooperates with the first target means to accurately determine the angular position of the rotor by detecting incremental variations in the first magnetic field in the first air gap.

The second magnetic sensing means includes second target means operatively associated with the rotor so as to rotate therewith. The second sensor means and the second target means are both fixedly mounted in spaced relation so as to be disposed at a variable distance from one another dependent upon the absolute angular position of the rotor to define a second air gap therebetween, and the second magnetic sensing means also includes second magnet means disposed in proximity to the second target means and the second sensor means to create a second magnetic field in the second air gap. With this arrangement, the second sensor means cooperates with the second target means to absolutely determine the angular position of the rotor by detecting continuous variations in the second magnetic field in the second air gap.

In the exemplary embodiment, the first target means is a gear having a plurality of teeth about the periphery thereof. The gear preferably includes a circular disc operatively associated with the rotor and the teeth are of substantially identical pitch radius and thickness and equally spaced about the circular disc. In addition, the gear is adapted to rotate as on a shaft or the like at the same speed as the rotor.

Preferably, the first sensor means is a first magnetic sensor mounted in a fixed position relative to the gear. The first magnetic sensor is disposed in a common plane with the gear in confronting but radially spaced relation to the teeth. Moreover, the first magnetic sensor is adapted to detect repetitive incremental variations in the first magnetic field as the gear rotates.

Still more particularly, the first magnetic sensor produces output signals indicative of the incremental variations in the first magnetic field. The intensity of the first magnetic field at any point in time is dependent upon the length of the first air gap as determined by the position of the nearest of the teeth relative to the first magnetic sensor at that point in time. As will be understood, the output signals change in magnitude in a manner indicative of the incremental variations by reason of changes in the magnitude of the first magnetic field intensity.

In the preferred embodiment, the first magnet means is a permanent magnet disposed in confronting but radially spaced relation to the teeth. The permanent magnet is disposed in radial alignment with the first magnetic sensor which is disposed intermediate tne permanent magnet and the teeth of the gear and includes a pair of spaced sensing elements disposed in a common plane with the gear in confronting but radially spaced relation to the teeth. Preferably, the permanent magnet is disposed in centered relation relative to the spaced sensing elements.

In the exemplary embodiment, the second target means is a wheel having a generally smooth outer surface about the periphery thereof. The wheel preferably includes a circular disc having a continuously increasing radial dimension. Moreover, the circular disc has a radial offset on the outer surface at a common point of maximum and minimum radial dimension.

With this arrangement, the second sensor means is preferably a second magnetic sensor mounted in a fixed position relative to the wheel. The second magnetic sensor is advantageously disposed in a common plane with the wheel in confronting but radially spaced relation to the outer surface. Moreover, the second magnetic sensor senses continuous variations in the second magnetic field as the wheel rotates relative to the second magnetic sensor.

Still more particularly, the second magnetic sensor produces output signals indicative of the continuous variations in the second magnetic field. The intensity of the second magnetic field at any point in time is dependent upon the length of the second air gap as determined by the angular position of the wheel relative to the second magnetic sensor at that point in time. As will be appreciated, the output signals change in magnitude in a manner indicative of the smooth, uninterrupted continuous variations by reason of changes in magnitude of the second magnetic field intensity.

Preferably, the second magnet means is a permanent magnet disposed in confronting but radially spaced relation to the outer surface of the wheel. In the preferred embodiment, the permanent magnet is disposed in radial alignment with the second magnetic sensor which is disposed intermediate the permanent magnet and the outer surface of the wheel.

Still further, the position detecting apparatus preferably includes means for monitoring output signals for each of the first and second sensor means. The output signals are indicative of the first and second magnetic fields with the first sensor means accurately determining a specific discrete plurality of accurate incremental or relative angular positions of the rotor and the second sensor means absolutely determining the absolute angular position of the rotor. With this arrangement, the monitoring means determines tne accurate and absolute angular position of the rotor from the output signals.

Furthermore, the monitoring means determines the accurate and absolute angular position of the rotor when rotation begins by converting the output signal from the second sensor means into an approximate angular position reading. The approximate angular position reading is determined when the first sensor means detects the next of the specific discrete plurality of accurate incremental or relative angular positions and the approximate angular position reading simultaneously is compared with the accurate angular position. By so doing, the monitoring means then corrects the approximate angular position reading to an accurate and absolute angular position corresponding to the accurate angular position of the specific discrete plurality of angular positions as detected by the first sensor means.

In the preferred embodiment, the monitoring means also monitors elapsed time and angular velocity of the rotor. The monitoring means determines the accurate and absolute angular position during periods of constant angular velocity and between the specific discrete plurality of accurate angular positions by making incremental angular adjustments thereto. As will be understood, the incremental angular adjustments are determined from the angular velocity and elasped time.

Preferably, the monitoring means also monitors elapsed time and angular acceleration of the rotor. The monitoring means determines the accurate and absolute angular position during periods of angular acceleration and between the specific discrete plurality of accurate angular positions by making incremental angular adjustments thereto. In this manner, the incremental angular adjustments are determined by angular velocity, elapsed time and angular acceleration.

In an alternative embodiment, the position detecting apparatus includes third magnetic sensing means for compensating for inaccuracies in the absolute angular position of the rotor as determined by the second magnetic sensing means. The third magnetic sensing means preferably includes third target means operatively associated with the rotor so as to rotate therewith, third sensor means disposed at a fixed distance from the third target means independent of the absolute angular position of the motor to define a third air gap therebetween, and third magnet means disposed in proximity to the third target means and the third sensor means to create a third magnetic field in the third air gap. With this arrangement, the third sensor means cooperates with the third target means to compensate for inaccuracies in the absolute position of the rotor by detecting variations from a reference level for the third magnetic field in the third air gap.

Still additional details of the alternative embodiment of the position detecting apparatus include the third target means comprising a wheel having a smooth surface. The third sensor means is preferably a third magnetic sensor mounted in a fixed position relative to a surface of the wheel and is preferably disposed in spaced relation to the wheel so as to produce an output signal indicative of the third magnetic field. As will be understood, the intensity of the third magnetic field is dependent upon actual operating conditions and the output signal is compared with a signal representative of the reference level to detect variations therebetween.

Preferably, the third magnet means is a permanent magnet disposed in confronting but spaced relation to the surface of the wheel. With this arrangement, the permanent magnet is advantageously disposed in alignment with the third magnetic sensor which is disposed intermediate the permanent magnet and the surface of the wheel.

Still other objects, advantages and features of the present invention will be appreciated from a consideration of the following specification taken in conjunction with the accompanying drawings.

BRIEF DESCRIPTION OF THE DRAWINGS

FIG. 1 is a cross-sectional view illustrating a position detecting apparatus in accordance with the present invention;

FIG. 2 is a cross-sectional view illustrating an alternative embodiment of the inventive position detecting apparatus;

FIG. 3 a cross-sectional view illustrating still another alternative embodiment of the inventive position detecting apparatus;

DETAILED DESCRIPTION OF THE PREFERRED EMBODIMENTS

Figure 4:
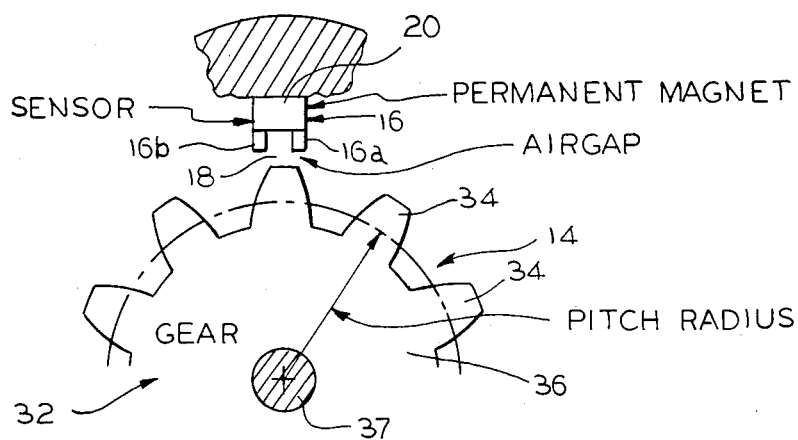
FIG. 4 is a cross-sectional view taken on the line 4—4 of FIG. 1.

With reference first to FIG. 1, the reference numeral 10 designates generally a position detecting apparatus in accordance with the invention which includes first magnetic sensing means 12 for accurately determining the angular position of a rotor (not shown). The first magnetic sensing means 12 includes first target means 14 operatively associated with the rotor so as to rotate therewith, first sensor means 16 disposed at a fixed distance from the first target means 14 independent of the absolute angular position of the rotor to define a first air gap 18 therebetween, and first magnet means 20 disposed in proximity to the first target means 14 and the first sensor means 16 to create a first magnetic field in the first air gap 18. With this arrangement, the first sensor means 16 cooperates with the first target means 14 to accurately determine the incremental or relative angular position of the rotor by detecting repetitive incremental variations in the first magnetic field in the first air gap 18.

Still referring to FIG. 1, the position detecting apparatus 10 also includes second magnetic sensing means 22 for absolutely determining the angular position of the rotor. The second magnetic sensing means 22 includes second target means 24 operatively associated with the rotor so as to rotate therewith, second sensor means 26 disposed at a variable distance from the second target means 24 dependent upon the absolute angular position of the rotor to define a second air gap 28 therebetween, and second magnet means 30 disposed in proximity to the second target means 24 and the second sensor means 26 to create a second magnetic field in the second air gap 28. With this arrangement, the second sensor means 26 cooperates with the second target means 24 to absolutely determine the angular position of the rotor by detecting smooth, uninterrupted continuous variations in the second magnetic field in the second air gap 28.

Referring to FIG. 4, the first target means 14 is a gear 32 having a plurality of teeth 34 about the periphery thereof. The gear 32 includes a circular disc 36 operatively associated with the rotor and the teeth 34 are of substantially identical pitch radius and thickness and equally spaced about the circular disc 36. Additionally, the gear 32 is adapted to rotate as on the shaft 37 or the like at the same speed as the rotor.

As shown in FIG. 4, the first sensor means 16 is a first magnetic sensor mounted in a fixed position relative to the gear 32. The first magnetic sensor 16 is preferably disposed in a common plane with the gear 32 in confronting but radially spaced relation to the teeth 34. With this arrangement, the first magnetic sensor 16 can detect incremental variations in the first magnetic field as the gear 32 rotates relative to the first magnetic sensor 16.

As will be appreciated, the first magnetic sensor 16 will produce output signals indicative of the repetitive incremental variations in the first magnetic field. The intensity of the first magnetic field at any point in time will be dependent upon the length of the first air gap 18 as determined by the position of the nearest of the teeth 34 relative to the first magnetic sensor 16 at that point in time. As a result the output signals will change in magnitude and in a manner indicative of the incremental variations by reason of changes in magnitude of the first magnetic field intensity.

Still referring to FIG. 4, the first magnet means 20 is a permanent magnet disposed in confronting but radially spaced relation to the teeth 34 and disposed in radial alignment with the first magnetic sensor 16 which is disposed intermediate the permanent magnet 20 and the teeth 34 of the gear 32. With this arrangement, the first magnetic sensor 16 includes a pair of spaced sensing elements 16a and 16b disposed in a common plane with the gear 32 in confronting but radially spaced relation to the teeth 34, and the permanent magnet 20 is disposed in centered relation relative to the spaced sensing elements 16a and 16b.

Figure 5:
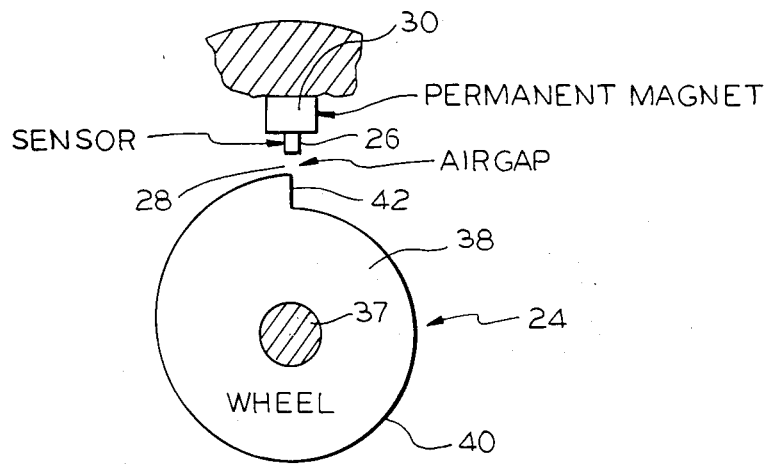
FIG. 5 is a cross-sectional view taken on the line 5—5 of FIG. 1.

Referring now to FIGS. 1 and 5, the second target means 24 is a wheel 38 having a generally smooth outer surface 40 about the periphery thereof. The wheel 38 is a circular disc having a continuously increasing radial dimension with a radial offset as at 42 on the outer surface 40 at a common point of maximum and minimum radial dimension. Referring specifically to FIG. 5, the second sensor means 26 is a second magnetic sensor mounted in a fixed position relative to the wheel 38.

As shown, the second magnetic sensor 22 is disposed in a common plane with the wheel 38 in confronting but radially spaced relation to the outer surface 40. The second magnetic sensor 22 senses smooth, uninterrupted continuous variations in the second magnetic field as the wheel 38 rotates as on the shaft 37 or the like relative to the second magnetic sensor 22. Further, the second magnetic sensor 22 produces output signals indicative of the continuous variations in the second magnetic field.

As with the first magnetic sensor 16 illustrated in FIG. 4, the intensity of the second magnetic field at any point in time is dependent upon the length of the second air gap 28 as determined by the angular position of the wheel 38 relative to the second magnetic sensor 16 at that point in time. The output signals change in magnitude in a manner indicative of the continuous variations by reason of changes in magnitude of the second magnetic field intensity. Also, as before, the second magnet means 30 is a permanent magnet disposed in confronting but radially spaced relation to the outer surface 40 of the wheel 38 in radial alignment with the second magnetic sensor 26 which is disposed intermediate the permanent magnet 30 and the outer surface 40 of the wheel 38.

Referring once again to FIG. 1, the position detecting apparatus 10 also includes means for monitoring output signals from each of the first and second sensor means 16 and 26, respectively. The monitoring means 44 monitors output signals which are indicative of the first and second magnetic fields with the first sensor means 16 accurately determining a specific discrete plurality of accurate angular positions of the rotor and the second sensor means 26 absolutely determining the absolute angular position of the rotor. As a result, the monitoring means 44 is capable of determining the accurate and absolute angular position of the rotor from the output signals.

More specifically, the monitoring means 44 determines the accurate and absolute angular position of the rotor when rotation begins by converting the output signal from the second sensor means 26 into an approximate angular position reading. The approximate angular position reading is determined when the first sensor means 16 detects the next of the specific discrete plurality of accurate angular positions, i.e., the next null point, anc the approximate angular position reading simultaneously is compared with the accurate angular position. Furthermore, the monitoring means 44 corrects the approximate angular position reading to an accurate and absolute angular position corresponding to the accurate angular position of the specific discrete plurality of accurate angular positions as detected by the first sensor means 16.

Because of the features of the components, the monitoring means 44 also monitors elapsed time and angular velocity of the rotor. The monitoring means 44 determines the acculate and absolute angular position during periods of constant angular velocity and between the specific discrete plurality of accurate angular positions by making incremental angular adjustments thereto. As will be appreciated, the incremental angular adjustments are determined from the angular velocity and elapsed time in accordance with well-establised principles.

Moreover, the monitoring means 44 also monitors elapsed time and angular acceleration of the rotor and determines the accurate and absolute angular position during periods of angular acceleration. Furthermore, it makes this determination between the specific discrete plurality of accurate angular positions by making incremental angular adjustments thereto. As will also be appreciated, the incremental angular adjustments are determined by angular velocity, elasped time and angular acceleration in accordance with well-established principles.

In the preferred embodiment, the position detecting apparatus 10 may also include third magnetic sensing means 46 for compensating for inaccuracies in the absolute angular position of the rotor as determined by the second magnetic sensing means 22. The third magnetic sensing means 46 includes third target means 48 operatively associated with the rotor so as to rotate therewith, third sensor means 50 disposed at a fixed distance from the third target means 48 independent of the absolute angular position of the rotor to define a third air gap 52 therebetween, and third magnet means 54 disposed in proximity to the the third target means 48 and the third sensor means 50 to create a third magnetic field in the third air gap 52. With this arrangement, the third sensor means 50 cooperates with the third target means 48 to compensate for inaccuracies in the absolute position of the rotor by detecting variations from a reference level for the third magnetic field in the third air gap 52.

In the embodiment illustrated in FIG. 1, the third target means 48 is the planar surface of the second target means 24. This is entirely satisfactory since the third sensor means 50 can be disposed at a fixed distance from the planar surface so described independent of the absolute angular position of the rotor to define the third air gap 52 therebetween. However, the third magnetic sensing means 46 can be formed as an independent component should it be desired to do so.

Referring to FIG. 2, the position detecting apparatus 10' is quite similar to the position detecting apparatus 10 of FIG. 1. It includes first magnetic sensing means 12' having first target means 14', first sensor means 16', a first air gap 18', and a permanent magnet 20'. It also includes second magnetic sensing means 22' having second target means 24', second sensor means 26', a second air gap 28', and a second permanent magnet 30'. However, the third magnetic sensing means 46' is an entirely independent component.

As shown in FIG. 2, the third magnetic sensing means 46' is also adapted to compensate for inaccuracies in the absolute angular position of the rotor as determined by the second magnetic sensing means 22'. The third magnetic sensing means 46' includes third target means 48' in the form of an entirely separate wheel 56 having a smooth surface 58 and being operatively associated with the rotor as on the shaft 37' or the like so as to rotate therewith, third sensor means 50' in the form of a third mangetic sensor mounted in a fixed position relative to the surface 58 of the wheel 56 and disposed at a fixed distance therefrom independent of the absolute angular position of the rotor to define a third air gap 52' therebetween, and third magnet means 54' disposed in proximity to the third target means 48' and the third sensor means 50' to create a third magnetic field in the third air gap 52'. With regard to both the third magnetic sensor 50 and the third magnetic sensor 50', they both produce an output signal indicative of the third magnetic field, the intensity of which is dependent upon actual operating conditions, and the output signal is compared with a signal representative of the reference level to detect variations therebetween.

As with the embodiment illustrated in FIG. 1, the third magnet means 54' is a permanent magnet disposed in confronting but spaced relation to the surface 58 of the wheel 56. Still more specifically, the permanent magnet 54' is disposed in alignment with the third magnetic sensor 50' which is disposed intermediate the permanent magnet 54' and the surface 58 of the wheel 56.

As shown in FIG. 2, monitoring means 44' is provided for monitoring the output signals from each of the first, second and third sensor means 16', 26', and 50'. The monitoring means 44' determines the absolute angular position of the rotor when stationary by converting the output signal from the second sensor means 26' into an approximate angular position reading and comparing the output from the third sensor means 50' with a signal representative of the reference level for the third magnetic field to detect variations therebetween. Further, the monitoring means 44' converts the approximate angular position reading into a compensated absolute angular position reading.

With this construction, the first magnetic sensing means 12' accurately determines a specific discrete plurality of accurate angular positions of the rotor. The monitoring means 44' determines the absolute angular position when rotation begins by converting the output signal from the second sensor means 26' into an approximate angular position reading, comparing the output signal from the third sensor means 50' with the signal representative of the reference level for the third magnetic field to detect variations therebetween, correcting the approximate angular position reading into a compensated absolute angular position reading, and comparing the compensated absolute angular position reading with the specific discrete plurality of accurate angular positions. When this has been done, the monitoring means 44' converts the compensated absolute angular position reading to an accurate and absolute angular position corresponding to the nearest one of the specific discrete plurality of accurate angular positions.

Referring to FIG. 3, still another embodiment of position detecting apparatus 10'' is illustrated in detail. This embodiment utilizes a first sensor means 16'', second sensor means 26'' and third sensor means 50'' essentially identical to the earlier described embodiments illustrated in FIGS. 1 and 2. It also utilizes permanent magnets 20'', 30'', and 54'' having the same characteristics and features of the corresponding components in the earlier described embodiments. However, as will be appreciated, the first, second and third target means 14'', 24'', and 48'' are defined by a single wheel 60.

As shown in FIG. 3, the wheel 60 has a plurality of surfaces 14a'', 24a'', and 48a'', with one of the surfaces 14a'' having teeth (such as 34 illustrated in FIG. 4)

about the periphery thereof, one of the surfaces 24a″ having a continuously increasing radial dimension (such as outer surface 40 in FIG. 5) about the periphery thereof, and one of the surfaces 48a″ being a smooth surface (such as outer surface 48′ illustrated in FIG. 6 or the smooth confronting surface illustrated in FIG. 1) which always remains at a fixed distance from a fixed point. With this arrangement, the first, second and third sensor means 16″, 26″, and 50″ each are magnetic sensors mounted in a fixed position relative to the respective ones of the surfaces 14a″, 24a″, and 48a″.

More specifically, the first sensor means 16″ is mounted in a fixed position relative to the surface 14a″ having the teeth about the periphery thereof. The second sensor means 26″ is mounted in a fixed position relative to the surface 24a″ having the continuously increasing radial dimension about the periphery thereof. Moreover, the third sensor means 50″ is mounted in a fixed position relative to the surface which always remains at a fixed distance from a fixed point. With this construction, the monitoring means 44″ operates similarly to the monitoring means 44 and 44′.

With the embodiments illustrated, the sensors may be of the coil, Hall effect, or magnetoresistive type and may be statically mounted at a predetermined distance from the targets. The targets may consist of gears and/or wheels with the gear being a circular disc having teeth on its outer radial surface, the wheel being circular or of other shape and having a smooth surface, and the targets being mounted on a shaft such as 37′, for instance, in a cascade form as illustrated in FIG. 2. Since the shaft 37′ will be mounted on bearings in conventional manner, it is free to rotate thus enabling the targets to rotate at the speed of the rotor.

A sensor such as a magnetoresistive sensor senses a variation in magnetic field intensity at its surface plane. It also outputs an analog signal proportional to this variation of field strength with the sensing occuring due to the well-known scientific fact that the resistance of a permalloy material changes when exposed to a magnetic field. By utilizing a KMZ10 chip consisting of four resistances connected in the form of a bridge, an electric current is supplied to the bridge from an external circuit and the voltage across the bridge is monitored.

As the resistance changes due to the magnetic field, so will the bridge voltage. This voltage variation is the output signal and the variation in the magnetic field strength is caused by the target near the sensor, the magnitude of the variation being directly related to the length of the air gap. As will be appreciated, the field itself is supplied by the properly aligned permanent magnet as shown in FIGS. 1 through 6.

Figure 6:
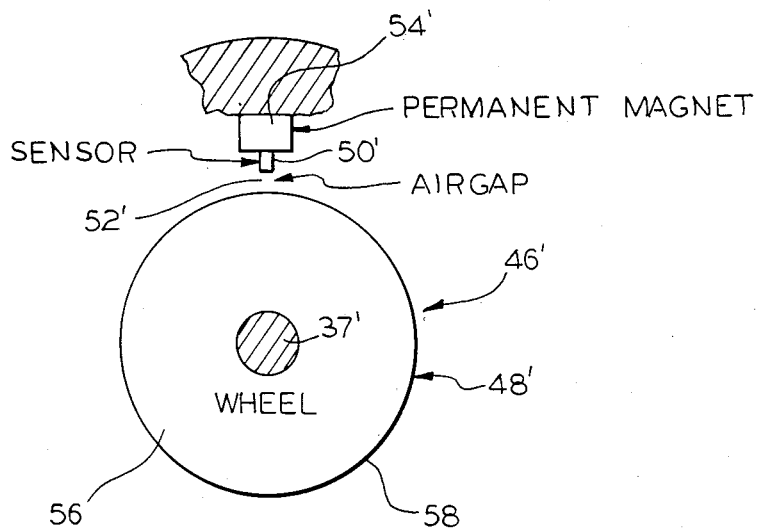
FIG. 6 is a cross-sectional view taken on the line 6—6 of FIG. 2.

The quality of the sensor output signal is adversely affected by manufacturing and environmental factors such as assembly variations, geometric tolerances and eccentricities, temperature, and component aging. To overcome these problems, a combination of targets and sensors is made with a target gear together with two sensors being provided for accurate angle sensing as shown in FIG. 4, a target wheel with one or two sensors being provided for absolute measurement as shown in FIG. 5, and a target wheel with a fixed air gap and magnetic sensor for compensating thermal and other environmental effects as illustrated in FIG. 6, for example. Of course, the alternatives illustrated in FIGS. 1 and 3 can also be utilized in exactly the same manner to achieve the same advantages to be derived from the present invention.

Referring to FIG. 4, it will be appreciated that when the two magnetic sensors are so aligned with the gear that both have equal air gaps, the output voltages from the two sensors will be exactly equal. This will be true regardless of any thermal or other environmental effects or manufacturing deviations, and the two output voltage signals can now be compared and the exact location at the position shown can be obtained as the null voltage point as the gear rotates. However, this accurate location is obtained at only certain positions corresponding to the number of teeth on the gear, and the sensor does not determine the absolute angular position but merely recognizes that the gear position is at any one of the null positions.

Referring to FIG. 5, there is a single magnetic sensor that faces a target such that the air gap is variable and is a function of the rotor angular position. The output voltage from the magnetic sensor is uniquely related to the air gap and hence to the absolute angular position of the rotor, but this output voltage is subject to variations due to manufacturing and environmental changes as previously mentioned. To compensate for the environmental effects, a sensor/target arrangement as shown in FIG. 6 can be utilized, and since this arrangement has a fixed air gap regardless of rotor position, it provides an output voltage that is a function of environmental effects only.

During actual operation, the output voltage from all sensors is monitored by an external circuit. At stall condition (stationary), an approximate rotor position is given by the absolute sensor, the signals from this sensor and the compensating sensor are compared and a compensated absolute angle position is determined by the monitoring circuit. When so done, the position so determined is absolute and sufficiently accurate but is not corrected for manufacturing variations.

When the shaft starts rotating at an instant $T_0$ and the absolute position is $\theta_0$ at that time, it reaches a first null position on the sensor illustrated in FIG. 4 at time $T_1$. If the angular measure shown by the compensated absolute sensor at this point in time is $\theta_1$, then the accurate and absolute angle is given by:

$$\theta_{11} = \frac{360°}{2 \times g} \times n$$

where
"g" = number of gear teeth, and
"n" = integer that satisfies the following relationship:

$$\theta_1 - [360 + 2g] \times n \div 360 + 4 g$$

At this instant $T_1$, the monitoring circuit corrects the absolute angle to $\theta_{11}$ from $\theta_1$ via its logic circuit, thus measuring absolute and accurate angular positions.

As the rotor rotates further, the angular position measured by the monitoring circuit is changed from $\theta_{11}$ by addition of angle $\Delta\theta$ given by:

$$\Delta\theta = (\Delta T)(W)$$

where "$\Delta T$" is the time elapsed and "W" is the angular velocity as monitored by the monitoring circuit when the shaft velocity is constant. This mode of measurement will continue until the shaft reaches the next accurate measurement as determined by the next null position of the accurate sensor. At this time, the circuit monitor will once again correct its output angular position in the manner described hereinabove.

During periods of acceleration, rather than constant velocity, the monitoring circuit shall also measure the angular acceleration $\alpha$ and then the additional angle $\Delta\theta$ will be given by $\Delta\theta=(\Delta T)(W+\frac{1}{2}\alpha T)$.

Thus the arrangement, together with monitoring circuit, provides the absolute and accurate position of the rotor during rotation. This is useful in brushless DC motors where the performance of the motor in terms of efficiency and power factor depends upon the determination of accurate rotor position and, even when the rotor is at standstill, the arrangement described here still determines the absolute position. At this point, however, accuracy of position is not particularly important because the brushless DC motor is drawing a DC current.

While in the foregoing there have been set forth preferred embodiments of the invention, it will be understood that the details herein given may be varied by those skilled in the art without departing from the spirit and scope of the invention as defined by the appended claims.

We claim:

1. A position detecting apparatus, comprising:
   first magnetic sensing means for accurately determining the angular position of a rotor fixedly mounted on a shaft for rotation therewith, said first magnetic sensing means including first target means having repetitive incremental variations in the periphery thereof fixedly mounted on said shaft so as to be operatively associated with said rotor so as to rotate with said shaft and said rotor, first sensor means fixedly mounted in spaced relation to said first target means and disposed at a fixed distance from the peripheral variations thereof independent of the absolute angular position of said rotor to define a first air gap therebetween, and first magnet means fixedly mounted in proximity to said first target means and said first sensor means to create a first magnetic field in said first air gap, said first sensor means cooperating with said first target means to accurately determine the relative angular position of said rotor by detecting repetitive incremental variations in said first magnetic field in said first air gap produced by said first target means as it rotates with said shaft;
   second magnetic sensing means for absolutely determining the angular position of said rotor, said second magnetic sensing means including second target means having a smooth continuous variation in the periphery thereof fixedly mounted on said shaft so as to be operatively associated with said rotor so as to rotate with said shaft and said rotor, second sensor means fixedly mounted in spaced relation to said second target means and disposed at a variable distance from the periphery thereof dependent upon the absolute angular position of said rotor to define a second air gap therebetween, and second magnet means fixedly mounted in proximity to said second target means and said second sensor means to create a second magnetic field in said second air gap, said second sensor means cooperating with said second target means to absolutely determine the angular position of said rotor by detecting smooth, uninterrupted continuous variations in said second magnetic field in said second air gap produced by said second target means as it rotates with said shaft; and
   means for monitoring output signals from each of said first and second sensor means, said output signals being proportional to variations in magnetic field strengths so as to be indicative of said first and second magnetic fields, said first sensor means producing an output signal for accurately determining each of a specific discrete plurality of accurate relative angular positions of said rotor and said second sensor means producing an output signal for approximately determining the approximate angular position of said rotor, said monitoring means determining the accurate and absolute angular position of said rotor by combining said output signals;
   said approximate angular position being determined whenever said output signal from said first sensor means detects the next of said specific discrete plurality of accurate relative angular positions, said monitoring means simultaneously combining said output signals from said first and second sensor means to compare said approximate angular position with said accurate relative angular position, said approximate angular position being corrected to the accurate and absolute angular position corresponding to said accurate relative angular position of said specific discrete plurality of accurate relative angular positions as detected by said first sensor means.

2. The position detecting apparatus as defined by claim 1 wherein said first target means is a gear having a plurality of teeth about the periphery thereof, said gear including a circular disc operatively associated with said rotor and said teeth being of substantially identical pitch radius and thickness and equally spaced about said circular disc, said gear being adapted to rotate at the same speed as said rotor.

3. The position detecting apparatus as defined by claim 2 wherein said first sensor means is a first magnetic sensor mounted in a fixed position relative to said gear, said first magnetic sensor being disposed in a common plane with said gear in confronting but radially spaced relation to said teeth, said first magnetic sensor detecting incremental variations in said first magnetic field as said gear rotates relative to said first magnetic sensor.

4. The position detecting apparatus as defined by claim 3 wherein said first magnetic sensor produces output signals indicative of said incremental variations in said first magnetic field, the intensity of said first magnetic field at any point in time being dependent upon the length of said first air gap as determined by the position of the nearest of said teeth relative to said first magnetic sensor at that point in time, said output signals changing in magnitude in a manner indicative of said incremental variations by reason of changes in magnitude of said first magnetic field intensity.

5. The position detecting apparatus as defined by claim 4 wherein said first magnet means is a permanent magnet disposed in confronting but radially spaced relation to said teeth, said permanent magnet being disposed in radial alignment with said first magnetic sensor, said first magnetic sensor being disposed intermediate said permanent magnet and said teeth of said gear.

6. The position detecting apparatus as defined by claim 4 wherein said first magnetic sensor includes a pair of spaced sensing elements, said spaced sensing elements being disposed in a common plane with said gear in confronting but radially spaced relation to said teeth, said first magnet means being a permanent magnet disposed in centered relation relative to said spaced sensing elements.

7. The position detecting apparatus as defined by claim 1 wherein said second target means is a wheel having a generally smooth outer surface about the periphery thereof, said wheel including a circular disc having a continuously increasing radial dimension, said circular disc having a radial offset on said outer surface at a common point of maximum and minimum radial dimension.

8. The position detecting apparatus as defined by claim 7 wherein said second sensor means is a second magnetic sensor mounted in a fixed position relative to said wheel, said second magnetic sensor being disposed in a common plane with said wheel in confronting but radially spaced relation to said outer surface, said second magnetic sensor sensing continuous variations in said second magnetic field as said wheel rotates relative to said second magnetic sensor.

9. The position detecting apparatus as defined by claim 8 wherein said second magnetic sensor produces output signals indicative of said continuous variations in said second magnetic field, the intensity of said second magnetic field at any point in time being dependent upon the length of said second air gap as determined by the angular position of said wheel relative to said second magnetic sensor at that point in time, said output signals changing in magnitude in a manner indicative of said continuous variations by reason of changes in magnitude of said second magnetic field intensity.

10. The position detecting apparatus as defined by claim 9 wherein said second magnet means is a permanent magnet disposed in confronting but radially spaced relation to said outer surface of said wheel, said permanent magnet being disposed in radial alignment with said second magnetic sensor, said second magnetic sensor being disposed intermediate said permanent magnet and said outer surface of said wheel.

11. The position detecting apparatus as defined by claim 1 wherein said output signals from said first and second sensors also are indicative of elapsed time and angular velocity of said rotor, said accurate and absolute angular position being determined during periods of constant angular velocity and between said specific discrete plurality of accurate relative angular positions by making incremental angular adjustments thereto, said incremental angular adjustments being determined from said angular velocity and elapsed time.

12. The position detecting apparatus as defined by claim 11 wherein said output signals from said first and second sensors also are indicative of elapsed time and angular acceleration of said rotor, said accurate and absolute angular position being determined during periods of angular acceleration and between said specific discrete plurality of accurate relative angular positions by making incremental angular adjustments thereto, said incremental angular adjustments being determined by angular velocity, elapsed time and angular acceleration.

13. A position detecting apparatus, comprising:
first magnetic sensing means for accurately determining the angular position of a rotor fixedly mounted on a shaft for rotation therewith, said first magnetic sensing means including first target means having repetitive incremental variations in the periphery thereof fixedly mounted on said shaft so as to be operatively associated with said rotor so as to rotate with said shaft and said rotor, first sensor means fixedly mounted in spaced relation to said first target means and disposed at a fixed distance from the peripheral variations independent of the absolute angular position of said rotor to define a first air gap therebetween, and first magnet means fixedly mounted in proximity to said first target means and said first sensor means to create a first magnetic field in said first air gap, said first sensor means cooperating with said first target means to accurately determine the relative angular position of said rotor by detecting repetitive incremental variations in said first magnetic field in said first air gap produced by said first target means as it rotates with said shaft;

second magnetic sensing means for absolutely determining the angular position of said rotor, said second magnetic sensing means including second target means having a smooth continuous variation in the periphery thereof fixedly mounted on said shaft so as to be operatively associated with said rotor so as to rotate with said shaft and said rotor, second sensor means fixedly mounted in spaced relation to said second target means and disposed at a variable distance from the periphery thereof dependent upon the absolute angular position of said rotor to define a second air gap therebetween, and second magnet means fixedly mounted in proximity to said second target means and said second sensor means to create a second magnetic field in said second air gap, said second sensor means cooperating with said second target means to absolutely determine the angular position of said rotor by detecting smooth, uninterrupted continuous variations in said second magnetic field in said second air gap produced by said second target means as it rotates with said shaft;

third magnetic sensing means for compensating for inaccuracies in the absolute angular position of said rotor as determined by said second magnetic sensing means, said third magnetic sensing means including third target means fixedly mounted on said shaft so as to be operatively associated with said rotor so as to rotate with said shaft and said rotor, third sensor means fixedly mounted in spaced relation to said third target means at a fixed distance therefrom independent of the absolute angular position of said rotor to define a third air gap therebetween, and third magnet means fixedly mounted in spaced relation to said third target means so as to be disposed in proximity to said third target means and said third sensor means to create a third magnetic field in said third air gap, said third sensor means cooperating with said third target means to compensate for inaccuracies in the absolute angular position of said rotor by detecting variations from a reference level for said third magnetic field in said third air gap; and means for monitoring output signals from each of said first, second and third sensor means, said output signals being proportional to variations in magnetic field strengths so as to be indicative of said first, second and third magnetic fields, said first sensor means producing an output signal for accurately determining each of a specific discrete plurality of accurate relative angular positions of said rotor, said second sensor means producing an output signal for approximately determining the approximate angular position of said rotor, said third sensor means producing an output signal for comparison with a signal representative of a reference level to detect variations therebetween, said monitoring means determining the accurate and absolute angular position of said rotor by combining all of said output signals.

14. The position detecting apparatus as defined by claim 13 wherein said first target means is a gear having a plurality of teeth about the periphery thereof, said gear including a circular disc operatively associated with said rotor and said teeth being of substantially identical pitch radius and thickness and equally spaced about said circular disc, said gear being adapted to rotate at the same speed as said rotor, said first sensor means being a first magnetic sensor mounted in a fixed position relative to said gear, said first magnetic sensor being disposed in a common plane with said gear in confronting but radially spaced relation to said teeth, said first magnetic sensor detecting incremental variations in said first magnetic field as said gear rotates relative to said first magnetic sensor.

15. The position detecting apparatus as defined by claim 14 wherein said first magnetic sensor produces output signals indicative of said incremental variations in said first magnetic field, the intensity of said first magnetic field at any point in time being dependent upon the length of said first air gap as determined by the position of the nearest of said teeth relative to said first magnetic sensor at that point in time, said output signals changing in magnitude in a manner indicative of said incremental variations by reason of changes in magnitude of said first magnetic field intensity, said first magnetic means being a permanent magnet disposed in confronting but radially spaced relation to said teeth, said permanent magnet being disposed in radial alignment with said first magnetic sensor, said first magnetic sensor being disposed intermediate said permanent magnet and said teeth of said gear.

16. The position detecting apparatus as defined by claim 13 wherein said second target means is a wheel having a generally smooth outer surface about the periphery thereof, said wheel including a circular disc having a continuously increasing radial dimension, said circular disc having a radial offset on said outer surface at a common point of maximum and minimum radial dimension, said second sensor means being a second magnetic sensor mounted in a fixed position relative to said wheel, said second magnetic sensor being disposed in a common plane with said wheel in confronting but radially spaced relation to said outer surface, said second magnetic sensor sensing continuous variations in said second magnetic field as said wheel rotates relative to said second magnetic sensor.

17. The position detecting apparatus as defined by claim 16 wherein said second magnetic sensor produces output signals indicative of said continuous variations in said second magnetic field, the intensity of said second magnetic field at any point in time being dependent upon the length of said second air gap as determined by the angular position of said wheel relative to said second magnetic sensor at that point in time, said output signals changing in magnitude in a manner indicative of said continuous variations by reason of changes in magnitude of said second magnetic field intensity, said second magnet means being a permanent magnet disposed in confronting but radially spaced relation to said outer surface of said wheel, said permanent magnet being disposed in radial alignment with said second magnetic sensor, said second magnetic sensor being disposed intermediate said permanent magnet and said outer surface of said wheel.

18. The position detecting apparatus as defined by claim 13 wherein said third target means is a wheel having a smooth surface, said third sensor means being a third magnetic sensor mounted in a fixed position relative to a surface of said wheel, said third magnetic sensor being disposed in spaced relation to said wheel.

19. The position detecting apparatus as defined by claim 18 wherein said third magnetic sensor produces an output signal indicative of said third magnetic field, the intensity of said third magnetic field being dependent upon actual operating conditions, said output signal being compared with a signal representative of said reference level to detect variations therebetween.

20. The position detecting apparatus as defined by claim 19 wherein said third magnet means is a permanent magnet disposed in confronting but spaced relation to said surface of said wheel, sid permenant magnet being disposed in alignment with said third magnetic sensor, said third magnetic sensor being disposed intermediate said permanent magnet and said surface of said wheel.

21. A position detecting apparatus, comprising:
first magnetic sensing means for accurately determining the angular position of a rotor fixedly mounted on a shaft for rotation therewith, said first magnetic sensing means including first target means having repetitive incremental variations in the periphery thereof fixedly mounted on said shaft so as to be operatively associated with said rotor so as to rotate with said shaft and said rotor, first sensor means fixedly mounted in spaced relation to said first target means and disposed at a fixed distance from the peripheral variations thereof independent of the absolute angular position of said rotor to define a first air gap therebetween, and first magnet means fixedly mounted in proximity to said first target means and said first sensor means to create a first magnetic field in said first air gap, said first sensor means cooperating with said first target means to accurately determine the relative angular position of said rotor by detecting repetitive incremental variations in said first magnetic field in said first air gap produced by said first target means as it rotates with said shaft;
second magnetic sensing means for absolutely determining the angular position of said rotor, said second magnetic sensing means including second target means having a smooth continuous variation in the periphery thereof fixedly mounted on said shaft so as to be operatively associated with said rotor so as to rotate with said shaft and said rotor, second sensor means fixedly mounted in spaced relation to said second target means and disposed at a variable distance from the periphery thereof dependent upon the absolute angular position of said rotor to define a second air gap therebetween, and second magnet means fixedly mounted in proximity to said second target means and said second sensor means to create a second magnetic field in said second air gap, said second sensor means cooperating with said second target means to absolutely determine the angular position of said rotor by detecting smooth, uninterrupted continuous variations in said second magnetic field in said second air gap produced by said second target means as it rotates with said shaft;

third magnetic sensing means for compensating for inaccuracies in the absolute angular position of said rotor as determined by said second magnetic sensing means, said third magnetic sensing means including third target means fixedly mounted on said shaft so as to be operatively associated with said rotor so as to rotate with said shaft and said rotor, third sensor means fixedly mounted in spaced relation to said third target means and disposed at a fixed distance therefrom independent of the absolute angular position of said rotor to define a third air gap therebetween, and third magnet means fixedly mounted in spaced relation to said third target means so as to be disposed in proximity to said third target means and said third sensor means to create a third magnetic field in said third air gap, said third sensor means cooperating with said third target means to compensate for inaccuracies in the absolute angular position of said rotor by detecting variations from a reference level for said third magnetic field in said third air gap;

said first, second and third sensor means each producing output signals indicative of said first, second and third magnetic fields; and means for monitoring said output signals from each of said first, second and third sensor means, said monitoring means combining said output signals from said second and third sensor means to determine the absolute angular position of said rotor when stationary, said output signal from said second sensor means being indicative of an approximate angular position, said output signal from said third sensor means being comparable with a signal representative of said reference level for said third magnetic field to detect variations therebetween, said monitoring means combining said output signals to convert said approximate angular position into a compensated absolute angular position reading.

22. The position detecting apparatus as defined by claim 21 wherein said first magnetic sensing means accurately determines a specific discrete plurality of accurate angular positions of said rotor, said monitoring means determining the absolute angular position when rotation begins by converting said output signal from said second sensor means into an approximate angular position reading, comparing said output signal from said third sensor means with said signal representative of said reference level for said third magnetic field to detect variations therebetween, correcting said approximate angular position reading into a compensated absolute angular position reading, and comparing said compensated absolute angular position reading with said specific discrete plurality of accurate angular positions, said monitoring means converting said compensated absolute angular position reading to an accurate and absolute angular position corresponding to the nearest one of said specific discrete plurality of accurate angular positions.

23. The position detecting apparatus as defined by claim 22 wherein said output signals from said first and second sensors also are indicative of elapsed time and angular velocity of said rotor, said accurate and absolute angular position being determined during periods of constant angular velocity and between said specific discrete plurality of accurate angular positions by making incremental angular adjustments thereto, said incremental angular adjustments being determined from said angular velocity and elapsed time.

24. The position detecting apparatus as defined by claim 23 wherein said output signals from said first and second sensors also are indicative of elapsed time and angular acceleration of said rotor, said accurate and absolute angular position being determined during periods of angular acceleration and between said specific discrete plurality of accurate angular positions by making incremental angular adjustments thereto, said incremental angular adjustments being determined by angular velocity, elapsed time and angular acceleration.

25. The position detecting apparatus as defined by claim 21 wherein said first target means is a gear having a plurality of teeth about the periphery thereof, said gear including a circular disc operatively associated with said rotor and said teeth being of substantially identical pitch radius and thickness and equally spaced about said circular disc, said gear being adapted to rotate at the same speed as said rotor, said first sensor means being a first magnetic sensor mounted in a fixed position relative to said gear, said first magnetic sensor being disposed in a common plane with said gear in confronting but radially spaced relation to said teeth, said first magnetic sensor detecting incremental variations in said first magnetic field as said gear rotates relative to said first magnetic sensor.

26. The position detecting apparatus as defined by claim 25 wherein said first magnetic sensor produces output signals indicative of said incremental variations in said first magnetic field, the intensity of said first magnetic field at any point in time being dependent upon the length of said first air gap as determined by the position of the nearest of said teeth relative to said first magnetic sensor at that point in time, said output signals changing in magnitude in a manner indicative of incremental variations by reason of changes in magnitude of said first magnetic field intensity, said first magnet means being a permanent magnet disposed in confronting but radially spaced relation to said teeth, said permanent magnet being disposed in radial alignment with said first magnetic sensor, said first magnetic sensor being disposed intermediate said permanent magnet and said teeth of said gear.

27. The position detecting apparatus as defined by claim 26 wherein said second target means is a wheel having a generally smooth outer surface about the periphery thereof, said wheel including a circular disc having a continuously increasing radial dimension, said circular disc having a radial offset on said outer surface at a common point of maximum and minimum radial dimension, said second sensor means being a second magnetic sensor mounted in a fixed position relative to said wheel, said second magnetic sensor being disposed in a common plane with said wheel in confronting but radially spaced relation to said outer surface, said second magnetic sensor sensing continuous variations in said second magnetic field as said wheel rotates relative to said second magnetic sensor.

28. The position detecting apparatus as defined by claim 27 wherein said second magnetic sensor produces output signals indicative of said continuous variations in said second magnetic field, the intensity of said second magnetic field at any point in time being dependent upon the length of said second air gap as determined by the angular position of said wheel relative to said second magnetic sensor at that point in time, said output signals changing in magnitude in a manner indicative of said continuous variations by reason of changes in magnitude of said second magnetic field intensity, said second magnet means being a permanent magnet disposed in confronting but radially spaced relation to said outer surface of said wheel, said permanent magnet being disposed in radial alignment with said second magnetic sensor, said second magnetic sensor being disposed intermediate said permanent magnet and said outer surface of said wheel.

29. The position detecting apparatus as defined by claim 28 said third target means is a wheel having a smooth surface, said third sensor means being a third magnetic sensor mounted in a fixed position relative to a surface of said wheel, said third magnetic sensor being disposed in spaced relation to said wheel, said third magnetic sensor producing an output signal indicative of said third magnetic field, the intensity of said third magnetic field being dependent upon actual operating conditions, said output signal being compared with a signal representative of said reference level to detect variations therebetween, said third magnet means being a permanent magnet disposed in confronting but spaced relation to said surface of said wheel, said permanent magnet being disposed in alignment with said third magnetic sensor, said third magnetic sensor being disposed intermediate said permanent magnet and said surface of said wheel.

30. The position detecting apparatus as defined by claim 21 wherein said first, second and third target means are defined by a single wheel having a plurality of surfaces, one of said surfaces having teeth about the periphery thereof, one of said surfaces having a continuously increasing radial dimension about the periphery thereof, and one of said surfaces being a smooth surface always remaining at a fixed distance from a fixed point, said first, second and third sensor means each being a magnetic sensor mounted in a fixed position relative to one of said surfaces.

31. The position detecting apparatus as defined by claim 30 wherein said first sensor means is mounted in a fixed position relative to said surface having said teeth about the periphery thereof, said second sensor means is mounted in a fixed position relative to said surface having said continuously increasing radial dimension about the periphery thereof, and said third sensor means is mounted in a fixed position relative to said surface always remaining at a fixed distance from a fixed point.

* * * * *